June 2, 1942.   A. G. KORENEK   2,284,748
HANDLE FOR COOKING UTENSIL LIDS
Filed April 12, 1941
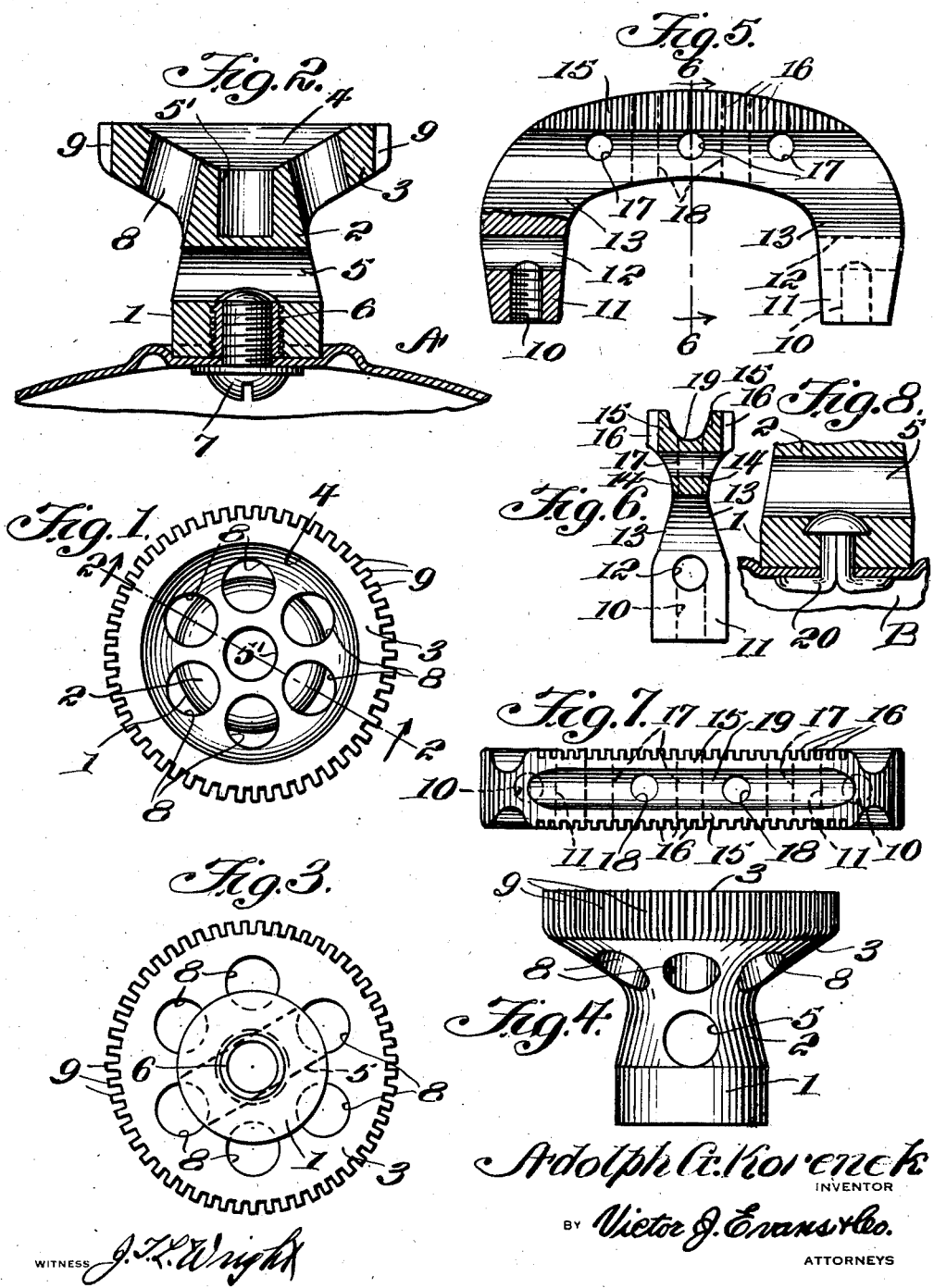
Adolph G. Korenek
INVENTOR
BY Victor J. Evans & Co.
ATTORNEYS
WITNESS J. K. Wright Patented June 2, 1942

2,284,748

UNITED STATES PATENT OFFICE 2,284,748

HANDLE FOR COOKING UTENSIL LIDS

Adolph George Korenek, Galveston, Tex.

Application April 12, 1941, Serial No. 388,320

2 Claims. (Cl. 16—118)

This invention relates to handles, and its general object is to provide a cooking utensil lid handle that includes gripping means which is retained in a cool condition at all times, as heat absorbed by the handle from the lid is not only retarded in conduction to the gripping means, but is rapidly dissipated before reaching the same. Thus it will be seen that the handle can be readily and firmly gripped, with utmost comfort, regardless of the temperature of the lid.

A further object is to provide a handle of the character set forth, either of the knob or bail type, that can be fastened to various types of lids in an easy and expeditious manner, and the handle is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a top plan view of the knob type handle which forms the subject matter of the present invention.

Figure 2 is a sectional view taken approximately on line 2—2 of Figure 1, looking in the direction of the arrows and illustrates the handle attached to a lid by screw fastening means.

Figure 3 is a bottom plan view of Figure 1.

Figure 4 is a side elevation.

Figure 5 is a front view of my bail type handle.

Figure 6 is a sectional view taken approximately on line 6—6 of Figure 5, looking in the direction of the arrows.

Figure 7 is a top plan view of the bail type handle.

Figure 8 is a fragmentary sectional view illustrating a modified form of fastening means for either type of handle.

Referring to the drawing in detail, and particularly to the knob type or form of Figures 1 to 4, the letter A indicates a fragmentary portion of a lid for a cooking utensil or the like, and while my handles can be attached to lids of any construction, the lid shown is provided with a seat, formed by an annular bead, for receiving the knob, as clearly shown in Figure 2.

The knob includes a substantially cylindrical body having a relatively wide short base portion 1 mounted in the seat of the lid, and from the base portion 1 the body is tapered inwardly as at 2. The tapered portion merges into an upwardly inclined thumb and finger gripping flange 3 formed on and disposed about the upper end of the body, and the top of the body is provided with a relatively deep concavity 4 that extends into the flange, as clearly shown in Figure 2.

Fixed centrally in the base portion and extending from its flat under face to a ventilating bore 5 disposed transversely of the tapered portion 2, is an interiorly threaded collar 6 for receiving the shank of a headed bolt 7 to secure the knob to the lid, and a vertically disposed cooling bore 5' is preferably provided centrally in the tapered portion from the concavity 4 to adjacent the bore 5, as shown in Figure 2. The head of the bolt is provided with a tool receiving kerf and a washer is preferably disposed between the head and the lid. The collar and shank of the bolt are relatively short for disposal a considerable distance below the gripping flange 3 which together with the body are made from any material having minimum heat conducting properties, such as wood, Bakelite or the like, while the collar and bolt are preferably made from metal, but extend into the ventilating bore, therefore it will be seen that very little heat will be conducted to the flange 3, as the major portion of the heat absorbed by the bolt and collar will be dissipated by the passage of air through the ventilating bore.

I also provide an annular row of ventilating bores or openings 8 extending at an angle through the flange 3 at its juncture with the body, to cooperate with the ventilating bore 5 to retain the flange in a cool condition, and in order to further cool the flange the periphery thereof has relatively deep notches therein to provide cooling fins 9, with the result it will be obvious that the flange can be readily and firmly gripped with utmost comfort regardless of the temperature of the lid.

The bail type handle in the form of Figures 5 to 7 includes an inverted substantially U-shaped body having threaded bores 10 extending from the flat under faces of the arms 11 thereof to receive the shanks of headed bolts similar to the bolt 7, and the bores open at their upper ends into ventilating bores 12 that extend transversely through the arms, as best shown in Figure 5, with the result it will be seen that the shanks of the bolts when used with the bail type handle likewise extend into ventilating bores to dissipate heat from the shanks by the air passing through the bores. Collars similar to the collars 6 may be disposed within the bores 10 for threadedly receiving the bolts, in the same manner as shown in Figure 2. In any event, the bolts act to attach the bail type handle to a lid or the like.

The upper ends of the arms 11 are tapered inwardly upon opposite sides and the tapered portions 13 merge in rounded formation into the bight portion 14 which is formed to provide upper laterally extending flanges 15 upon opposite sides thereof, the flanges providing finger and thumb gripping means, and merge into the bight portion in rounded formation, as indicated in Figures 5 and 6. The flanges 15 like the flange 3, have relatively deep notches therein to provide cooling fins 16 and the bight portion 14 has ventilating openings or bores 17 and 18 extending therethrough, the bores 17 being disposed horizontally and the bores 18 vertically, and these bores cooperate with the fins and bores 12 to retain the bail type handle in a cool condition, as will be apparent. A groove 19 is formed in the top of the bight portion 14 and extends longitudinally thereof, and the groove like the concavity 4 also tends to cool the handles.

While screw bolts have been previously mentioned for the purpose of attaching the handles to the lids, I may provide rivets 20 for that purpose, and the heads of the rivets as well as the major portion of the shanks thereof are embedded within the handles, as clearly shown in Figure 8, but the top of the heads or upper portions thereof are preferably exposed to the passage of air through the transversely disposed ventilating bores, such as the bores 12 of the bail type handle or the bore 5 of the knob type. The rivet shown is of the split type and the portions of the shank are spread for disposal against the under face of the lid B for securing the handle of Figure 8 thereto.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A handle for a cooking utensil lid, comprising a body including a base portion, an inwardly tapered portion rising from the base portion and having a ventilating passage therethrough, an annular flange formed on the tapered portion and having ventilating passages therethrough, said body and flange having a concavity in the upper faces thereof, said flange having notches about its periphery to provide cooling fins for cooperation with the passages to retain the handle in a cool condition, said base portion having a bore therein for receiving means to attach the handle to the lid, and said bore communicating with the ventilating passage of the tapered portion to expose the attaching means to the air within the bore.

2. A handle for a cooking utensil lid, comprising a body including a base portion, an inwardly tapered portion rising from the base portion and having a ventilating passage extending transversely therethrough, an annular flange formed on the upper end of the tapered portion and extending at an upward inclination therefrom, said flange having vertical passages extending therethrough in row formation and disposed at an angle to the first passage, said flange having relatively deep notches in the periphery thereof and providing cooling fins cooperating with the ventilating passages to retain the handle in a cool condition, said base portion having a bore therein for receiving means to attach the handle to the lid, and said bore communicating with the ventilating passage of the tapered portion to expose the attaching means to the air within the bore.

ADOLPH GEORGE KORENEK.